US006140406A

United States Patent [19]

Schliesman et al.

[11] Patent Number: 6,140,406

[45] Date of Patent: *Oct. 31, 2000

[54] HIGH SOLIDS INTERACTIVE COATING COMPOSITION, INK JET RECORDING MEDIUM, AND METHOD

[75] Inventors: Leonard J. Schliesman; Leland O. Tritz, both of Wisconsin Rapids; Karen K. Spreda, Plover, all of Wis.

[73] Assignee: Consolidated Papers, Inc., Wisconsin Rapids, Wis.

[ * ] Notice: This patent is subject to a terminal disclaimer.

[21] Appl. No.: 09/097,016

[22] Filed: Jun. 12, 1998

Related U.S. Application Data

[63] Continuation-in-part of application No. 08/672,649, Jun. 28, 1996, abandoned, and a continuation-in-part of application No. 08/874,166, Jun. 13, 1997.

[51] Int. Cl.$^7$ .............................. C08L 29/04; C08K 3/36; C08K 3/10; B32B 27/20

[52] U.S. Cl. .......................... 524/493; 524/437; 524/448; 524/503; 428/195; 106/482; 106/483; 106/494

[58] Field of Search .................................... 106/481, 482, 106/483, 491, 494; 524/492, 493, 430, 437, 448, 503; 523/160, 161; 428/195, 329, 331, 521

[56] References Cited

U.S. PATENT DOCUMENTS

| | | | |
|---|---|---|---|
| 3,759,744 | 9/1973 | Schliesman et al. . | |
| 3,889,270 | 6/1975 | Hoffman et al. . | |
| 4,102,845 | 7/1978 | Schroeder et al. . | |
| 4,371,582 | 2/1983 | Sugiyama et al. . | |
| 4,446,174 | 5/1984 | Maekawa et al. . | |
| 4,460,637 | 7/1984 | Miyamoto . | |
| 4,474,847 | 10/1984 | Schroder et al. . | |
| 4,478,910 | 10/1984 | Oshima et al. . | |
| 4,542,059 | 9/1985 | Toganoh et al. . | |
| 4,554,181 | 11/1985 | Cousin et al. . | |
| 4,576,867 | 3/1986 | Miyamoto . | |
| 4,620,197 | 10/1986 | Miyamoto et al. . | |
| 4,642,654 | 2/1987 | Toganoh et al. . | |
| 4,892,787 | 1/1990 | Kruse et al. . | |
| 4,900,620 | 2/1990 | Tokita et al. | 428/330 |
| 4,902,568 | 2/1990 | Morohoshi | 428/331 |
| 4,915,923 | 4/1990 | Ogawa et al. . | |
| 5,013,603 | 5/1991 | Ogawa et al. . | |
| 5,041,328 | 8/1991 | Akiya et al. . | |
| 5,057,570 | 10/1991 | Miller et al. | 524/503 |
| 5,213,873 | 5/1993 | Yasuda et al. . | |
| 5,266,397 | 11/1993 | Ogawa et al. . | |
| 5,270,103 | 12/1993 | Oliver et al. | 428/219 |
| 5,279,885 | 1/1994 | Ohmori et al. . | |
| 5,320,897 | 6/1994 | Kondo et al. . | |
| 5,437,925 | 8/1995 | Macaulay et al. . | |
| 5,459,502 | 10/1995 | Sakaki et al. | 347/100 |
| 5,472,757 | 12/1995 | Ogawa et al. | 428/40.2 |
| 5,478,631 | 12/1995 | Kawano et al. . | |
| 5,660,622 | 8/1997 | Nikoloff . | |
| 5,725,946 | 3/1998 | Fukushima et al. | 428/342 |
| 5,798,173 | 8/1998 | Momma et al. | 428/342 |
| 5,856,001 | 1/1999 | Okumura et al. | 428/331 |
| 5,882,388 | 3/1999 | Adair et al. | 106/31.6 |
| 5,882,755 | 3/1999 | Igarashi et al. | 428/41.8 |
| 5,928,787 | 7/1999 | Owatari et al. | 428/409 |

OTHER PUBLICATIONS

M. Takahashi, T. Sato & M. Ogawa, "Development of Amorphous Silica For Ink Jet Recording Paper", English Translation from Japan TAPPI, 42 (10), 23 (1990), Apr. 23, 1990.

Air Products' Polymer Chemicals Technical Bulletin (1996).

Hercules' Hercon 70, 72, 75, 76, and 78 Cationic Emulsions product brochure (1990).

BASF's Basoplat 335D Technical Information product brochure (1994).

Calgon's Paper Chemicals Products & Services Bulletin No. 29–218 (1992).

Kenite's Celite WPP Technical Bulletin No. 105 (1995).

Union Carbide's Polyox product brochure.

"Silica Pigments for Ink Jet Printability" Michael C. Withiam; presented at 1996 TAPPI Costing Conference Coating Roundtable (1996).

Kirk–Othmer Encyclopedia of Chemical Technology, Fourth Edition, vol. 21, Silica Gel, pp. 1020–1022.

Air Products Bulletin #152–9607, "Airvol PVA Typical Properties".

CIBA–GEIGY Technical Bulletin, "Fluorescent Whitening Agents for Paper" (1995).

Morton Waterbased Polymer Technical Bulletin, "Paper Chemicals MSA–150 Surface Size".

Davison Silica Gels Technical Bulletin, "Typical Chemical and Physical Properties of Silica Gel".

Hercules Product Data, "Chromaset 600 Surface Sizing Treatment", HER. 27167 Rev. 11–94.

SEQUA Chemicals, Technical Data, "Uniq–Print 8000".

D. M. Chapman, "Silica–Gel Coatings for Ink–Jet Media", Grace Davison Presentation Materials.

R.K. Iler, "The Chemistry of Silica," Chapter 5 Silica Gels and Powders, pp. 462–621, John Wiley & Sons, Inc. publisher (1979).

*Primary Examiner*—Vasu Jagannathan
*Assistant Examiner*—Callie E Shosho
*Attorney, Agent, or Firm*—Greer, Burns & Crain, Ltd.

[57] ABSTRACT

A coating composition for an ink jet recording medium comprises an aqueous suspension of absorptive pigment, a binder, a sizing agent, and a cationic fixing agent. The coating composition combines solids content of greater than 30% with good runnability. The composition may preferably be dispersed at pH values in the range of 4.5 to 7.0. The pigment is preferably a mixture of 75% or more silica gel having a pore volume of 0.5–2.0 cc/g, and 10% or more alumina or alumina hydrate. A method for making down the coating composition includes the sequential steps of dispersing a polyvinyl alcohol binder in water, cooling the binder dispersion, dispersing a sizing agent, and mixing the suspension thoroughly before addition of a cationic fixing agent and pigment.

23 Claims, No Drawings

HIGH SOLIDS INTERACTIVE COATING COMPOSITION, INK JET RECORDING MEDIUM, AND METHOD

CROSS REFERENCE

This is a continuation-in-part of copending applications Ser. Nos. 08/672,649 filed Jun. 28, 1996, abandoned, and 08/874,166 file Jun. 13, 1997, which applications are hereby incorporated by reference.

BACKGROUND OF THE INVENTION

This invention relates to coating compositions and ink recording media, especially adapted for ink jet printing, and methods for making the coating composition and recording media.

Ink jet printers employ a plurality of jets connected to a supply of liquid based ink. The jets have small openings and can be energized to emit uniform liquid droplets of ink in a continuous stream upon demand. The jets are controlled to print characters or images on a moving flat surface, usually a sheet of paper.

In order to improve print quality and drying time, many proposals have been made for coatings on paper to improve ink reception. For example, it is well known to coat paper with various absorptive pigments, binders and sizing agents. An aqueous suspension of these agents is applied to a paper or other substrate using conventional coating methods.

An ideal ink receiving coating on paper will allow rapid absorption of the liquid component of the ink, which correlates to a rapid ink drying time, while preventing diffusion of the ink colors into the paper substrate. At the same time, the coating should cause the ink pigment or dye to be fixed on the sheet surface in the form of well defined dots of uniform size and shape. A correct balance of these properties is very difficult to achieve, especially at higher printer resolutions and smaller dot diameters.

While a variety of acceptable coatings can be devised in theory, it is also imperative for the sake of economy that the coatings are capable of being applied uniformly to a base sheet at a high rate of speed using conventional coating equipment. Many of the known absorptive pigments, such as those based on powdered forms of silica, cannot be employed because an excessive amount of binder is required for processing at the solids content necessary to achieve the desired minimum coat weight. The suspensions become too thick or dilatant to allow pumping and uniform application using a conventional paper coater such as a blade coater. If lower binder levels are employed, this may also result in excessive dusting in the finished product.

It is required to produce a finished product with a smooth, uniform finish, free of defects. Scratches, streaks, and other defects are commonly caused by grit in the coating composition. Grit also causes undesirable wear on coating blades and other application equipment. Grit is formed in the coating composition due to agglomeration of pigment particles. The particles tend to agglomerate under various conditions, including the presence of agents which are reactive in some manner with the pigment, such as cationic fixing agents and sizing agents. However, the use of such agents is desirable for overall product quality.

Another condition that tends to increase the occurrence of agglomeration and hence grit is increasing solids concentration in the coating composition. In many prior art formulations, solids concentrations of above 15–25% were often not possible due to unacceptable levels of agglomeration.

In many commercial applications, however, a high solids concentration is needed to produce a finished coat weight of about 7–13 $g/m^2$ (5–8 lbs/3300 $ft^2$). Coat weights of this magnitude are difficult, and may even be impossible, to achieve using low solids content (15%–25%) coating compositions with standard coating application equipment.

Low solids concentration coatings also have correspondingly high water contents, resulting in relatively large energy requirements for drying.

For the foregoing reasons, an unfulfilled industry need exists for a high solids, i.e. 30% or greater, coating composition which remains relatively free from grit and which may be applied using standard coating equipment.

OBJECTS OF THE INVENTION

It is an object of the invention to provide a coating composition and a recording medium adapted for ink jet printing that will rapidly absorb the liquid component of the ink, thereby providing rapid ink drying time.

It is an additional object of the invention to provide an ink jet coating composition and recording medium that is interactive with ink jet dyes to fix the ink on the surface of the sheet without objectionable dye penetration or bleeding.

It is a further object of the invention to provide an ink jet coating composition that has a high solids content, is substantially free of grit, and which may be readily applied to a base sheet with a conventional blade coater.

A final object of the invention is to provide a sequential make down process whereby reactive agents may be added to the composition under conditions that prevent or minimize undesirable reactions with other agents and grit formation.

SUMMARY OF THE INVENTION

An ink receptive coating is applied to one or both sides of a substrate. The substrate may be optionally precoated with a size solution before the ink receptive coating is applied. The ink receptive coating generally comprises an absorptive pigment, a binder, a sizing agent, and a cationic fixing agent. The coating contains a high concentration of solids, above 30% and most preferably in the range 35–38%, and is capable of being uniformly applied using standard blade type coating equipment. The ink jet recording medium of the invention provides superior ink jet printing quality.

A preferred embodiment of the invention comprises an aqueous suspension with an absorptive silica pigment dispersed at low pH with a cationic fixing agent. Coatings with pH values of 4.0 to 7.5 have been found to give improved ink holdout over conventional coating compositions having pH values in the range of 8.0–9.0. The improved ink holdout results in better color saturation, reduced bleed through, and better overall print quality. Silica gels are preferred pigments. Silica gels with acceptably low pH values and high void volumes desirable for ink absorption are commercially available.

An alternate absorptive pigment is calcined diatomaceous earth. Coating compositions with diatomaceous earth pigments can be made with high solids concentrations, i.e. greater than 30%, and has excellent inkjet printing qualities. Diatomaceous earth has good ink solvent absorptive properties, but produces a coating composition having a pH value that is greater than 7. In addition, recording media with a high concentration of diatomaceous earth has been found to be undesirably abrasive.

The coating composition of the invention includes a binder. Although several suitable binders could be used, low molecular weight, partially hydrolyzed polyvinyl alcohol is preferred.

The coating composition of the invention preferably includes a sizing agent. While any of several sizing agents may be used, a preferred sizing agent is a styrene acrylic dispersion for use in combination with silica pigments. If the primary absorptive pigment is calcined diatomaceous earth, the preferred sizing agent comprises an acrylic sizing agent in an aqueous, amphoteric copolymer dispersion based on acrylic acid esters and acrylonitrile.

Cationized pigments hold more dye at the surface than anionic pigments. Accordingly, the coating composition of the invention preferably includes a cationic fixing agent, such as polycationic quaternary ammonium polymer, to cationize the pigment.

The order of addition of materials is critical with regards to the binder, the sizing agent, and the cationic fixing agent. The sizing and cationic agents are interactive. If improperly combined they can agglomerate, cause the formation of grit and rheology problems. It has been discovered that if the polyvinyl alcohol binder (or at least a portion thereof) is mixed with the sizing agent prior to introduction of the cationic fixing agent, compatibility problems are avoided. The polyvinyl alcohol binder can be thought of as protecting the sizing agent against reaction with the cationic fixing agent. Also, the polyvinyl alcohol binder should be at a temperature less than 49° C. (120° F.) and preferably at or below 38° C. (100° F.) to insure that the sizing agent does not react with the cationic fixing agent and subsequently precipitate out of solution.

Alumina may be added to the coating composition as a whitening agent and to improve rheology. For applications where an FDA approved coating is not required, a fluorescent whitening agent may be added.

Thus, the coating composition of the invention generally comprises, by bone dry parts by weight:

| | |
|---|---|
| 100 | parts pigment, at least 50% of which is an absorptive pigment |
| 10–50 | parts binder |
| 1–10 | parts sizing agent |
| 2–20 | parts cationic fixing agent |

A preferred embodiment has a pH value of 4.0 to 7.5 and comprises, approximately, in bone dry parts by weight:

| | |
|---|---|
| 75 | parts silica gel |
| 25 | parts alumina trihydrate |
| 40 | parts low molecular weight, partially hydrolyzed polyvinyl alcohol |
| 10 | parts polycationic quaternary ammonium polymer |
| 5 | parts styrene acrylic dispersion type sizing agent |
| 2 | parts whitening agent |

The coating of the present invention thus provides a high solids composition that may be uniformly applied to a substrate with conventional blade coaters. The coated ink jet medium of the present invention allows ink jet printing over a wide range of resolution with precise control of dot size (freedom from print mottle), dot size uniformity, and dot shape.

The ink jet media of the invention offers superior resistance to water. Printed sheets will not generally run or distort when splashed with water. This is a distinct advantage over conventional ink jet recording media.

Further objects and advantages of the invention will become apparent from the following detailed description of preferred embodiments.

DESCRIPTION OF PREFERRED EMBODIMENTS

The coating composition of the invention preferably comprises an aqueous suspension of an absorptive pigment, a binder, a sizing agent, and a cationic fixing agent. The formulation of the coating as well as the method of preparation provide a high solids content in addition to freedom from agglomeration and rheology problems, and therefor results in excellent runnability.

The coating composition of the invention is applied to a substrate, for example paper. When an ink jet is applied to the coated paper, the absorptive pigment particles absorb the ink solvent (primarily water) leaving the dyes on the surface of the particles. The cationic agent assists in fixing the dye on the surface. This results in rapid dry time and improved ink hold out and color density.

The preferred embodiment of the invention has a pH value of between about 4.5 and 7; most preferentially between 4.0 and 5.5. Although the precise technical effect is not fully known, it is believed that the acidic pH of the coating composition enhances the cationic function. Coatings at these preferred pH values have been found to have improved holdout of the ink jet ink dyes on the paper surface as compared to conventional alkaline coating compositions having pH values of 8.0 to 9.0. The improved holdout results in enhanced color saturation and better overall print quality. It also reduces dye penetration to the opposite side of the sheet.

Tests have been conducted on coating formulations of varying pH values. Coating compositions were prepared in accordance with the invention using pigments and binders selected to result in low pH values. Acid was added to lower pH values. A base, sodium hydroxide, was added to increase pH. It was found that when the pH of the composition is reduced to a value below about 4.0 the composition becomes unstable—the ingredients become less compatible and viscosity increases with time. As the pH is increased above about 5.5, to beyond a pH value of 7.5, the dispersion becomes similarly unstable, the viscosity of the composition becoming undesirably high. Accordingly, it has been found that a pH value in the range of about 4.5 to about 5.5 is most preferable.

The preferred silica type pigments are well suited for ink jet printing due to their high absorption properties. When evaluating the characteristics of voids in silica pigments, it is important to distinguish between primary particles, secondary or agglomerated particles and associated voids. The primary particles of some silicas agglomerate, that is, groups of primary particles cluster to form secondary particles. Other silicas lack agglomerates. Further, the structure of the primary particle may vary depending on the manufacturing process. Precipitated and gel processes produce porous primary particles, while the filmed silica process produces relatively small, glassy, non-porous particles. As a result, different void structures are created. Depending on the nature of the silica, there may be voids between secondary particles, voids between primary particles within the secondary particle structure, and voids within the primary particle. For purposes of the present application, the term "absorptive silica" means a silica where the primary particles are porous and capable of absorbing water. Also for the purposes of this application, the term "non-agglomerated" refers to a silica substantially free from agglomerates, i.e., the primary particles do not exhibit a tendency to cluster into secondary particles. Gel silicas are preferred as non-agglomerated, absorptive silicas, but some precipitated and hybrid silicas may also be non-agglomerated and absorptive. Generally, fumed silicas agglomerate and are not absorptive. For a further discussion of the properties of silica minerals see Withiam, Michael C., *Silica Pigments for Ink Jet Printing,* article presented at 1996 TAPPI Coating Conference, Nashville, Tenn., May 21, 1996. Precipitated silicas, calcium silicates, and diatomaceous earth also have good absorption capabilities, but aqueous dispersions thereof have pH values that normally range 7.0 to 9.5.

Silica gels are the preferred form of silica to be used as the pigment. When dispersed, silica gels have pH values ranging from 3.5 to 11.0, but many are in the 4.5 to 5.5 range. The physical properties of commercially available silica gels are as follows:

| | |
|---|---|
| Surface Area | 150–900 $m^2/g$ |
| Pore Volume | 0.4–2.2 cc/g |
| Oil Absorption | 35–300 g/100 g (35–300%) |
| pH | 3.5–11.5 |
| Average Particle Size | 2–17$\mu$ |

Ink jet print quality and coating rheology require a special set of properties. Silicas with high surface areas, above 400 $m^2/g$, are desiccants. Desiccants are unacceptable because they absorb moisture from the air thereby reducing ink absorptive capacity. Silica gels with low pore volumes, less than 0.5 cc/g, are undesirable, as they exhibit insufficient water absorption capacity. High pore volumes are desirable for water absorption capacity, but volumes above about 2.0 cc/g give excessively high coating viscosity's. Also, larger particle sizes are preferred for having high pore volume, but particle sizes greater than 16$\mu$ can give poor coating rheology. Thus, the preferred properties of the silica pigment in the coating composition of the invention are as follows:

| | |
|---|---|
| Surface Area | 340 $m^2/g$ |
| Pore Volume | 1.2 cc/g |
| Oil Absorption | 180 g/100 g (180%) |
| pH | 4.5–5.5 |
| Particle Size | 10–12$\mu$ |

Pigments meeting these criteria include Syloid 620 and Sylojet P612 from Grace Davison, W. R. Grace & Co., Connecticut. Sylojet P612 is preferred as it has no particles of diameter greater than 25$\mu$ which may cause scratches in the coating layer.

An alternate absorption pigment is diatomaceous earth, in particular, flux calcined diatomaceous earth having an average particle size in the approximate range of 2–10$\mu$ and an oil absorption of 100–200% by weight. Calcined diatomaceous earth should be distinguished from other forms of diatomaceous earth which have not been calcined. Most other forms will not allow for a sufficient coat weight or thickness to be applied, and generally do not offer the brightness of calcined diatomaceous earth. It has also been found that the calcined diatomaceous earth pigment has sufficient absorptive capacity in the resulting coating. An advantage of diatomaceous earth is that coating compositions with high levels of this pigment require only a low level of binder to hold it in aqueous suspension. Preferably, the amount of binder will not exceed 31% by weight of the pigment, since high binder levels reduce maximum coat weight and interfere with ink drying time. The composition provides a generally grit free coating composition with high solids concentration of greater than 30% and excellent ink jet printing performance. However, the coated substrate is likely to be undesirably abrasive.

Polyvinyl alcohol (PVOH) is an acceptable binder for the coating formulation of the invention. Starches and latex's are also suitable binders and could provide satisfactory strength. Latex binders may be advantageously used in combination with polyvinyl alcohol. Most latex binders are incompatible with cationic fixing agents, however. Accordingly, if a cationic fixing agent is used, one must select a compatible latex. Also, many starches have lower binding strength than PVOH and would require excessive levels of use.

Many polyvinyl alcohol's can be used, including low and medium molecular weight, partially and fully hydrolyzed. Fully hydrolyzed products are too water insoluble, give long ink dry times, and unstable viscosities. Medium molecular weight products give excessive viscosities and poor rheology. Thus, the preferred polyvinyl alcohol's are low molecular weight, partially hydrolyzed. One such product is Airvol 805 from Air Products and Chemicals, Inc., Allentown, Pa.

While any of several sizing agents may be used, the preferred sizing agent for combination with silica pigment is of a styrene acrylic dispersion type. An example of such material is Chromaset™ 600 Surface Sizing Treatment from Hercules, Inc., Wilmington, Del. A similar suitable sizing agent of the styrene acrylic dispersion variety is UniQ-Print® 8000 from Sequa Chemicals, Inc. Styrene butadiene latex type sizing agents may also prove useful. Since these latex agents may introduce compatibility problems with some of the other formulation components, however, the styrene acrylic dispersion agents are preferred. The amount of the sizing agent used has a direct influence on the diameter of the dots which are printed by a given printer at a fixed resolution.

The preferred sizing agent used in combination with diatomaceous earth pigment comprises an acrylic sizing agent, such as Basoplast 355-D from BASF, in an aqueous, amphoteric copolymer dispersion based on acrylic acid esters and acrylonitrile. Alternatively, the sizing agent for use in combination with diatomaceous earth may comprise an alkyl ketene dimer at 0.5 to 5% blended with an acrylic latex at 5 to 15% or other sizing agents such as styrene maleic anhydrides.

It has been found that cationized pigments hold more dye at the surface than anionic pigments. Also, cationic fixing agents are more effective at low pH conditions than they are at alkaline pH values. The type of cationic fixing agent used is not critical as long as it is compatible with the other coating ingredients. The fixing agent must be effective at concentrating the dyes at the coated surface, provide satisfactory runnability on a blade coater, and not adversely affect brightness. Suitable fixing agents include acrylamide acrylic polymers and their derivatives, polyamines and their derivatives, polyethylene oxide, and allylamine polymers. Preferably, the cationic fixing agent is a water soluble polymer having a high percentage of cationic groups such as tertiary amino or quaternary ammonium cationic groups. Water soluble polycationic quaternary ammonium polymer (polydimethyldiaflyl- ammonium chloride) is preferred in combination with silica pigment because the level of the agent may be varied substantially without flocculating the other coating ingredients. An example of this product is Lectrapel, marketed by Calgon Corporation, Water Management Division, Pittsburgh, Pa. (More currently known as Conductive Polymer 261LV marketed by ECCI International). The cationic fixing agent is added in an amount of from about 4 to about 10 bone dry parts by weight per 100 parts of pigment.

The order of addition of materials is critical with regards to the binder, the sizing agent, and the cationic fixing agent. The polyvinyl alcohol binder acts as a protective colloid of the sizing agent against reaction with the cationic fixing agent. By protecting the sizing agent against such unwanted reactions, agglomeration and hence grit is prevented from occurring in the coating composition. Thus, desirable benefits are achieved by mixing the polyvinyl alcohol binder (or at least a portion thereof ) with the sizing agent prior to introduction of the cationic fixing agent. Also, the polyvinyl alcohol binder should be at a temperature below 49° C. (120° F.) and preferably at or below 38° C. (100° F.) to insure that the sizing agent does not react with the cationic fixing agent. If the binder temperature is above 120° F. it has been found that the sizing agent will precipitate out of solution when the cationic agent is added.

A bright coating and one that is FDA approved for food packaging uses is desirable. Fluorescent whitening agents cannot be used for food packaging applications because they are not FDA approved. Alumina pigments are FDA approved, and are well suited whitening agents for the coating formulation of the invention. For the purposes of this application, the term "alumina" is used broadly to include aluminum oxide [$Al_2O_3$], aluminum trihydrate [$Al(OH)_3$] and other conventional aluminum containing pigments. These pigments also provide some alkalinity, which is desirable for use with alkaline-stabilized ink jet dyes. Alumina pigments can be stable at both cationic and low pH conditions. Several pigments would work in the formulation, but a dry alumina that can be added directly to the coating formulation of the invention and readily dispersed in it is preferred. One such product is Martifin OL-107 marketed by Martinswerk GmbH, Bergheim, Germany. The Martifin pigment readily disperses in the coating and is compatible with the other coating ingredients. The Martifin pigment, while increasing coating solids, improves rheology at the same time. Thus, inclusion of this pigment allows application by blade coater and achieves desirable coat weights of approximately 13 g/m$^2$ at 35% solids. This pigment also provides an acceptable brightness of 87 in a coating without fluorescent whitening agents.

For grades not requiring FDA approval, it is desirable to add a fluorescent whitening agent to the coating to increase the whiteness, brightness and blue color. While most fluorescent whitening agents would work to a certain degree, they must be stable in acid conditions and must be tolerant of the cationic coating to give optimum results. Most fluorescent whitening agents do not fall into this category. Two products, however, that do are from the Stilbene-Triazine derivatives family. Products of this type are Ciba-Geigy's Tinopal HST and SCP liquids, available from Ciba-Geigy, Paper Dyes and Chemicals, Greensboro, N.C.

To achieve the desired coating properties and ink jet quality the preferred low pH, silica gel pigment coating composition with sizing agent is preferably made down with the following order of addition while undergoing continuous high shear mixing:

| Bone Dry Weight | Material | Wet Weight |
|---|---|---|
| | Water | 35.7 |
| 30 | Polyvinyl alcohol @ 5% solids | 200.0 |
| 5 | Sizing Agent @ 47% solids | 10.6 |
| 10 | Cationic fixing agent @ 40% solids | 25.0 |

-continued

| Bone Dry Weight | Material | Wet Weight |
|---|---|---|
| 25 | Alumina @ 100% solids | 25.0 |
| 75 | Silica pigment @ 97% solids | 77.0 |
| 10 | Polyvinyl alcohol @ 15% solids | 67.0 |
| 2[1] | Fluorescent whitening agent | 2.0 |

[1]For the fluorescent whitening agent, the two parts listed are parts in liquid form as received from the supplier.

If polyvinyl alcohol (PVOH) is the desired binder, it must first be dispersed in water before beginning the make-down process. Preferably, the polyvinyl alcohol is cooked at 15% solids in water for 30 minutes at 95° C. This cooking process completely disperses the polyvinyl alcohol in the water. The PVOH/water dispersion is then cooled below 49° C. (120° F.) and preferably to 38° C. (100° F.) or less.

Next, a sizing agent at about 47% solids is added to the polyvinyl alcohol solution in a make-down vessel. As mentioned above, it is critical that the polyvinyl alcohol binder and the sizing agent be mixed together before introduction of the cationic fixing agent. The polyvinyl alcohol binder acts as a colloid protector of the sizing agent and will prevent unwanted reactions from occurring between the sizing agent and the cationic fixing agent. Without this protective action, the cationically charged fixing agent would tend to attract sizing agent particles and thereby agglomerate with them, causing grit in the coating composition. The temperature should be below 49° C. and preferably below 38° C. during this mixing step so that the sizing agent does not precipitate out of solution upon addition of the cationic fixing agent. After allowing at least several minutes under dispersion for mixing to occur, the cationic fixing agent can be introduced.

Disperser speed is then increased to add sufficient shear to disperse the alumina pigment. The disperser can be of any of the normal dispersing blades such as Cowles or Gaulin. Alumina can be rapidly added to the coating as the pigment is readily dispersed.

After dispersing the alumina pigment for 10 minutes, the silica pigment is then added. The silica pigment should be added slowly into the vortex so it may be completely wetted out and dispersed before additional pigment is added. The disperser speed should be high enough to support a vortex into which the silica is added. Silica pigment added anywhere else but into the vortex will build-up on the tank wall and harden. It will not be properly dispersed. Both the cationic agent and silica pigment should be added at the indicated points of addition to avoid excessively high viscosity's, incompatibilities, and grit formation.

After the silica pigment addition is complete, the remaining polyvinyl alcohol and any additives, e.g., a fluorescent whitening agent, are added. The coating is then mixed for an additional 10–20 minutes depending on volume. The coating composition is then ready for use.

The solids content of the preferred coating composition suspension should be above 30%, and preferably above 35% to achieve coat weights of at least 7 g/m$^2$ (5 lb/3300 ft$^2$) with conventional coating equipment. Desirably, the percent solids should be as high as possible to reduce the energy needed to dry the coating composition on the substrate. It has been found that above about 38% solids the coating composition of the invention is difficult to smoothly apply with conventional equipment. Solids contents of 35–38% provides desirable coat weights of about 10 g/m$^2$ (7 lb/3300 ft$^2$).

The ink jet recording medium of the present invention comprises a substrate with the coating composition of the invention applied thereto. The substrate may comprise a variety of types of paper webs or plastic substrates such as mylar. Paper webs may include groundwood-free sheets, groundwood sheets or a combination thereof The basis weight of acceptable paper substrates may vary greatly, from very light Bible papers having basis weight of about 32 g/m$^2$ to heavy, specialty papers having basis weight of 450 g/m$^2$ or more. Paper substrates may be uncoated, size press coated, or precoated, and the paper may be machine-glazed or machine finished. Depending on the nature of the substrate, a precoating or other treatment may be useful to reduce porosity, or to provide a better bonding surface for the subsequent coating, or to better prevent migration of the subsequent coating into the web. Preferably, rosin or other sizing is added to achieve 40 or less g/m$^2$/min Cobb sizing, to reduce penetration of liquid into the web. (Cobb size is a standard test to determine the amount of water absorbed during contact with the web and is measured in grams per square meter per minute.)

One or both sides of the paper web may be precoated with size solution to provide brightness and color and to provide sufficient holdout for the final coating. The precoating is applied in a conventional manner and may contain conventional pigments, binders and sizing agents. Preferably, the TAPPI brightness is 85 or greater, and the TAPPI "b" color is equal to or less than 2. If the subsequently applied ink-receiving coat will be applied to only one side of the web, a lightweight coating may also be applied to the other side of the web to minimize potential sheet curl.

The precoat may comprise conventional pigments such as clay, titanium dioxide, calcium carbonate and others well known to those skilled in the art. The binders may comprise starch, soy protein, latex and the like. A sizing agent may be employed such as rosin, starch and other known sizing agents. The base web is preferably sized at values less than 40 g/m$^2$/min Cobb size, and the coat weight is in the order of about 3 to about 8 g/m$^2$ (2–5 lb/3300 ft$^2$), A preferred substrate for cut size ink jet papers comprises a low ash base stock made square (having similar cross-direction "CD" and machine-direction "MD" physical properties), having a basis weight of between 74–119 g/m$^2$. The base stock is size coated with a light starch and pigment coating and dried prior to application of the ink receptive coating.

A preferred substrate suitable for ink jet label paper comprises machine glazed ("Yankee") 48–65 g/m$^2$ base stock with a wet strength resin in the base sheet to prevent cockle. The ink receptive coating is applied to the machine glazed side of the sheet. The back side of the sheet is coated with a pigment latex coating for curl control.

After the web has been dried, the ink receptive coating of the invention is preferably applied over at least one side using a conventional coater, and then is dried. The desired coat weight is at least 7 g/m$^2$ (5 lb/3300 ft$^2$) and preferably 8–15 g/m$^2$ (5.5–10 lb/3300 ft2). If the weight is significantly below 7 g/m$^2$, the resulting paper will exhibit less than desirable print quality and excessive ink penetration. After drying, the ink receptive coating layer will have a thickness of at least 8$\mu$ and preferably from about 8 to about 12$\mu$. The pigments in the coating provide an absorptive capacity for the liquid component of the ink to be applied, and the thickness of the coating layer is correlated to the absorption rate and hence ink drying time.

Depending on resolution of the printer, the size of the dots to be printed ranges in the order of 75 to 160$\mu$. Ink jet printing of 1000 to 1200 dots per inch, when available, will require dots having a diameter of down to 40$\mu$ or less. The present invention contemplates the use of various binders and sizing agents, depending on the resolution needed for a printer. The binder level and sizing agents contribute to the control of dot diameter and other properties.

In further illustration of the present invention, the following examples are presented. "Parts" in each example refer to bone dry parts by weight, except for the fluorescent whitening agent which is parts in liquid form as received from the supplier. For the purpose of the Examples, the below definitions are applicable:

Mottle

HP Print: Non-uniformity of ink density in the solid print areas. Rating 1 to 3 with three having little or no mottle.

Pigment Black Bleed

A general increase in printed line width. HP ratings 1 to 3 with three being best and having little or no increase. Epson: Okay or poor as observed.

Cockle

The degree to which the sheet will deviate from its original shape upon printing or having oth applied to it. Okay or poor as observed.

Scratch resistance

The degree to which coating comes off the sheet when scratched with the fingernail. Ratings 1 to 5 with five being best and there being no removal of coating.

Tape Pull

A measure of the amount of coating which separates from the fiber and adheres to cellophane tape when tape is pressed on then slowly pulled off at right angles to the sheet. Rating 1 to 5 with five being best and there is no removal of coating from the fibers.

Dusting

The degree to which coating will come off the sheet when rubbed with the tip of the finger. Okay or poor as observed.

EXAMPLE 1

An 86 g/m$^2$ prime coated freesheet paper was used as the base sheet. The base sheet was coated using a conventional blade coater at a weight of 11.5 g/m$^2$ on the wire side. Two different compositions were made down at 36% solids; one with 5 parts of the preferred sizing agent and one with 10 parts:

| Bone Dry Parts | Materials |
|---|---|
| 30 | Airvol 805 low molecular weight, partially hydrolyzed polyvinyl alcohol polymer |
| 5, 10 | Chromaset 600 styrene acrylic dispersion sizing agent |
| 10 | Lectrapel cationic agent (polycationic quaternary ammonium) |
| 75 | Grace-Davison Syloid 620 silica gel |
| 25 | Martifin OL-107 alumina trihydrate |
| 10 | Airvol 805 polyvinyl alcohol |
| 2 | Tinopal HST fluorescent whitening agent |

The dried sheets were then tested, the results being:

Qualitative Wire Side Analysis:

| Parts Sizing Agent: | 5 | 10 |
|---|---|---|
| Coatweight ($g/m^2$) | 11.5 | 11.5 |
| Smoothness | | |
| PrintSurf | 8.29 | 8.30 |
| Hagerty | 282 | 281 |
| Opticals | | |
| Brightness | 94.0 | 93.8 |
| "b" | −2.2 | −2.2 |
| FWA Contribution | 6.3 | 6.3 |
| Strength | | |
| Tape Pull | 4 | 3.5 |
| Scratch | 4 | 5 |
| Coefficient of Friction | | |
| Static | 0.95 | 0.91 |
| Kinetic | 0.68 | 0.66 |
| Epson Stylus Print Tests | | |
| Intensity | 8 | 8 |
| Half-Tone Mottle | 7.5 | 7.5 |
| Total | 15.5 | 15.5 |
| Average Density | 1.58 | 1.54 |
| Hewlett Packard Print Tests | | |
| Ink Dry Time | 51 | 48 |
| Mottle | 2.5 | 2.5 |
| Pigment Black | 2.5 | 2.5 |

EXAMPLE 2

A 74 $g/m^2$ prime coated freesheet paper was used as the base sheet. The base sheet was coated using a conventional blade coater at a weight of 11.5 $g/m^2$ on the wire side. Two different compositions were made down at 36% solids; one with 2.5 parts of the preferred sizing agent and one with 5 parts:

| Bone Dry Parts | Materials |
|---|---|
| 30 | Airvol 805 low molecular weight, partially hydrolyzed polyvinyl alcohol polymer |
| 2.5/5 | Chromaset 600 styrene acrylic dispersion sizing agent |
| 10 | Lectrapel cationic agent (polycationic quaternary ammonium) |
| 75 | Grace-Davison Syloid 620 silica gel |
| 25 | Martifin OL-107 alumina trihydrate |
| 10 | Airvol 805 polyvinyl alcohol |
| 2 | Tinopal HST fluorescent whitening agent |

The dried sheets were then tested, the results being:

Qualitative Wire Side Analysis:

| Parts Sizing Agent: | 2.5 | 5 |
|---|---|---|
| Coatweight($g/m^2$) | 11.5 | 11.5 |
| Smoothness | | |
| PrintSurf | 8.25 | 8.28 |
| Hagerty | 293 | 299 |
| Opticals | | |
| Brightness | 93.0 | 93.2 |
| "b" | −2.8 | −2.9 |

-continued

| Parts Sizing Agent: | 2.5 | 5 |
|---|---|---|
| FWA Contribution | 5.9 | 6.1 |
| Strength | | |
| Tape Pull | 2.5 | 2.7 |
| Scratch | 4.2 | 4.2 |
| Coefficient of Friction | | |
| Static | 0.74 | 0.76 |
| Kinetic | 0.38 | 0.45 |
| Epson Stylus Print Tests | | |
| Intensity | 8 | 8 |
| Half-Tone Mottle | 8 | 8 |
| Total | 16 | 16 |
| Average Density | 1.60 | 1.60 |
| Hewlett Packard Print Tests | | |
| Ink Dry Time | 25 | 32 |
| Mottle | 3 | 3 |
| Pigment Black | 1.5 | 2 |

EXAMPLE 3

A 74 $g/m^2$ prime coated freesheet paper was used as the base sheet. The base sheet was coated using a conventional blade coater at a weight of 11.5 $g/m^2$ on the wire side. Two different compositions were made down at 36% solids; one with 2.5 parts of an alternate sizing agent and one with 5 parts:

| Bone Dry Parts | Materials |
|---|---|
| 30 | Airvol 805 low molecular weight, partially hydrolyzed polyvinyl alcohol polymer |
| 2.5, 5 | UniQ-Print 8000 styrene acrylic dispersion sizing agent |
| 10 | Lectrapel cationic agent (polycationic quaternary ammonium) |
| 75 | Grace-Davison Syloid 620 silica gel |
| 25 | Martifin OL-107 alumina trihydrate |
| 10 | Airvol 805 polyvinyl alcohol |
| 2 | Tinopal HST fluorescent whitening agent |

The dried sheets were then tested, the results being:

Qualitative Wire Side Analysis:

| Parts Sizing Agent: | 2.5 | 5 |
|---|---|---|
| Coatweight ($g/m^2$) | 11.5 | 11.5 |
| Smoothness | 8.25 | 8.26 |
| PrintSurf | | |
| Hagerty | 294 | 297 |
| Opticals | | |
| Brightness | 93.2 | 93.4 |
| "b" | −2.9 | −3.1 |
| FWA Contribution | 6.0 | 6.4 |
| Strength | | |
| Tape Pull | 2.2 | 2.5 |
| Scratch | 4 | 4 |
| Coefficient of Friction | | |
| Static | 0.76 | 0.83 |
| Kinetic | 0.39 | 0.46 |

-continued

| Parts Sizing Agent: | 2.5 | 5 |
|---|---|---|
| Epson Stylus Print Tests | | |
| Intensity | 8 | 8 |
| Half-Tone Mottle | 9 | 8 |
| Total | 17 | 16 |
| Average Density | 1.60 | 1.60 |
| Hewlett Packard Print Tests | | |
| Ink Dry Time | 32 | 42 |
| Mottle | 3 | 3 |
| Pigment Black | 1.5 | 2.5 |

EXAMPLE 4

An 86 g/m$^2$ prime coated freesheet paper was used as the base sheet. The base sheet was coated using a conventional blade coater at a weight of 11.5 g/m$^2$ on the wire side. Two different compositions were made down at 36% solids; one with 5 parts of an alternate sizing agent and one with 10 parts:

| Bone Dry Parts | Materials |
|---|---|
| 30 | Airvol 805 low molecular weight, partially hydrolyzed polyvinyl alcohol polymer |
| 5/10 | UniQ-Print 8000 styrene acrylic dispersion sizing agent |
| 10 | Lectrapel cationic agent (polycationic quaternary ammonium) |
| 75 | Grace-Davison Syloid 620 silica gel |
| 25 | Martifin OL-107 alumina trihydrate |
| 10 | Airvol 805 polyvinyl alcohol |
| 2 | Tinopal HST fluorescent whitening agent |

The dried sheets were then tested, the results being:

Qualitative Wire Side Analysis:

| Parts Sizing Agent: | 5 | 10 |
|---|---|---|
| Coatweight (g/m$^2$) | 11.5 | 11.5 |
| Smoothness | | |
| PrintSurf | 8.30 | 8.27 |
| Hagerty | 268 | 277 |
| Opticals | | |
| Brightness | 93.8 | 94.3 |
| "b" | −2.2 | −2.5 |
| FWA Contribution | 6.3 | 6.4 |
| Strength | | |
| Tape Pull | 5 | 5 |
| Scratch | 5 | 4.5 |
| Coefficient of Friction | | |
| Static | 0.92 | 0.94 |
| Kinetic | 0.68 | 0.67 |
| Epson Stylus Print Tests | | |
| Intensity | 8 | 8 |
| Half-Tone Mottle | 7.5 | 7.5 |
| Total | 15.5 | 15.5 |
| Average Density | 1.56 | 1.56 |

-continued

| Parts Sizing Agent: | 5 | 10 |
|---|---|---|
| Hewlett Packard Print Tests | | |
| Ink Dry Time | 49 | 70 |
| Mottle | 2.5 | 2 |
| Pigment Black | 2.5 | 3 |

EXAMPLE 5

Tests were conducted to evaluate the performance of the ink jet coating composition of the invention machine glazed paper. In one case, an ink jet receptor coating made in accordance with the invention was applied to the machine glazed side of the sheet and a curl control coating was applied to the back side. In a second case, the ink jet coating was applied to the back side and the curl control coating was applied to the machine glazed side. In both cases a 55 g/m$^2$ uncoated, machine glazed, freesheet paper with internal wet strength was used as the base sheet. The ink jet receptor coating as specified below was applied with a conventional blade coater at a rate of 10.5 g/m$^2$ and curl control coating was applied at 6.5 g/m$^2$. The solids content of both coatings was 35–36%.

Ink Jet Coating

| Bone Dry Parts | Materials |
|---|---|
| 30 | Airvol 805 low molecular weight, partially hydrolyzed polyvinyl alcohol |
| 5 | Chromaset 600 styrene acrylic sizing agent |
| 10 | Lectrapel cationic agent (polycationic quaternary ammonium) |
| 75 | Grace-Davison Sylojet 612 silica gel |
| 25 | Martifin OL-107 alumina trihydrate |
| 10 | Airvol 805 low molecular weight, partially hydrolyzed polyvinyl alcohol |
| 2 | Tinopal HST fluorescent whitening agent |

Curl Control Coating

| Bone Dry Parts | Materials |
|---|---|
| 100 | Minerals & Chemicals' Ultra Cote No. 2 high brightness clay |
| 16 | Dow 8879 styrene butadiene latex |
| 3 | Airvol 805 polyvinyl alcohol |
| 0.3 | $NH_4OH$ |
| 0.37 | BASF Sterocoll FG acrylic thickening agent |
| 2 | Tinopal HST whitening agent |

The dried sheets were then tested, the results being:

| | MG | BS |
|---|---|---|
| Opticals | | |
| Brightness | 92.6 | 92.5 |
| Dust Tests | | |
| Rating | 2.5 | 3.5 |
| Density (change) | 0.23 | 0.14 |

-continued

| | MG | BS |
|---|---|---|
| Epson 800 Print Tests | | |
| Intensity | 7.5 | 7.5 |
| Half-Tone Mottle | 7.5 | 7 |
| Total | 15 | 14.5 |
| Ave Density | 1.55 | 1.53 |
| HP Print Tests | | |
| Drytime (sec) | 10 | 0 |
| 4-Color Mottle | 2+ | 2+ |
| Pigment Black | 1.5 | 1.5 |

The ink jet coating applied to the machine glazed side had significantly less print mottle, and thus better print quality, than when applied to the back side. Ink jet prints on these samples did not run or distort when splashed with water. This is a distinct advantage over prior art ink jet grades used in non-outdoor applications.

EXAMPLE 6

A 52 pound (77 g/$m^2$) precoated, groundwood-free paper was used as the base sheet. The base sheet was coated using a conventional blade coater at a coat weight of 11.5 g/$m^2$ on both the wire and felt sides. The following coating composition was made down at 3 5% solids at a pH value of 5.3:

| Bone Dry Parts | Materials |
|---|---|
| 75 | Grace-Davison Syloid 620 silica gel |
| 25 | Martifin OL-107 alumina trihydrate |
| 40 | Airvol 805 low molecular weight, partially hydrolyzed polyvinyl alcohol |
| 10 | Lectrapel cationic agent (polycationic quaternary ammonium polymer) |
| 2 | Tinopal HST fluorescent whitening agent |

The dried sheets were then tested, the results being:

| | Wire Side | Felt Side | Qualitative Analysis |
|---|---|---|---|
| Coatweight (g/$m^2$) | 11.5 | 11.5 | |
| Basis Weight (g/$m^2$) | 103 | 103 | |
| % Moist. Content | 4.9 | 4.9 | |
| Smoothness | | | |
| PrintSurf | 7.91 | 7.89 | (acceptable) |
| Hagerty | 221 | 224 | (acceptable) |
| Opticals | | | |
| Brightness | 93.6 | 93.4 | (very good) |
| Lightness | 94.7 | 94.9 | (very good) |
| "a" | 2.2 | 2.0 | (good, slight red tint) |
| "b" | −3.1 | −2.9 | (good, slight blue tint) |
| FWA Contribution | 7.0 | 6.6 | (very good) |
| Strength | | | |
| Tape Pull | 4.5 | 4.5 | (excellent) |
| Scratch | 5 | 5 | (excellent) |
| Coefficient of Friction | | | |
| Static | 0.92 | 0.87 | (acceptable) |
| Kinetic | 0.50 | 0.59 | (good) |

-continued

| | Wire Side | Felt Side | Qualitative Analysis |
|---|---|---|---|
| Epson Stylus Print Tests | | | |
| Intensity | 8 | 8 | (very good) |
| Half-Tone Mottle | 8 | 9 | (very good) |
| Total | 16 | 17 | (very good) |
| Average Density | 1.56 | 1.55 | (excellent) |
| Hewlett Packard Print Tests | | | |
| Ink Dry Time | 33 | 0 | (very good) |
| Mottle | 3 | 3 | (very good) |
| Pigment Black | 2 | 2 | (good) |

EXAMPLE 7

A precoated, 43 pound (63.6 g/$m^2$) groundwood-free sheet was used as the base sheet. This base sheet was then coated on both the wire and felt sides with an ink receptive coating formulation at 9.6 g/m2. The following coating composition was made down at 27.4 % solids at a pH value of 4.3:

| Parts | Materials |
|---|---|
| 75 | Grace-Davison Syloid 620 silica gel |
| 25 | Martifin OL-107 alumina trihydrate |
| 40 | Airvol 823 medium molecular weight, partially hydrolyzed polyvinyl alcohol |
| 10 | Lectrapel cationic agent (polycationic quaternary ammonium polymer) |

After drying, the coated paper was cut to 8.5 by 11 inch sheets and print tested. The printers used were a Hewlett Packard 560C and an Epson Stylus ink jet printers. Both printers utilize four colors of ink (black, yellow, magenta and cyan). The results were:

| | Wire | Felt |
|---|---|---|
| HP Prints | | |
| 4-Color Black Density | 1.28 | 1.25 |
| Drytime (sec) | 97 | 107 |
| Pigmented Black | Good | Good |
| 4-Color Mottle | Good | Good |
| Epson Prints | | |
| Mottle | 8 | 8 |
| Intensity | 8 | 8 |
| Overall Print Quality | 16 | 16 |

The results show excellent four color print quality in both the Hewlett Packard and Epson printers. Ink dry times, however, were long. However, a solids content over 30% was not achieved due to the use of a medium molecular weight polyvinyl alcohol.

EXAMPLE 8

An ink receptive coating was applied by an applicator roll, inverted blade coater at 11.5 g/$m^2$ to both sides of a 52 pound (77 g/$m^2$) precoated, groundwood-free sheet. The following ink receptive coating was made down at 34.9% solids and a pH value of 5.5. The ink receptive coating comprised:

| Parts | Material |
|---|---|
| 75 | Grace Syloid 620 silica gel |
| 25 | Martifin OL-107 alumina trihydrate |
| 50 | Airvol 805 low molecular weight, partially hydrolyzed polyvinyl alcohol |
| 10 | Lectrapel cationic fixing agent |
| 2 | Tinopal HST fluorescent whitening agent |

A significantly high solids content was achieved using a low molecular weight polyvinyl alcohol.

EXAMPLE 9

An ink receptive coating was applied by a laboratory blade coater at 11.4 g/$m^2$ to both sides of a 62 pound (92 g/$m^2$) precoated, groundwood-free base sheet. The following ink receptive coating was made down at 36.0% solids and a pH value of 5.6, and was maintained at temperatures below 100 F:

| Parts | Material |
|---|---|
| 75 | Grace Syloid 620 silica gel |
| 25 | Martifin OL-107 alumina trihydrate |
| 40 | Airvol 805 low molecular weight, partially hydrolyzed polyvinyl alcohol |
| 20 | XU 31294.5 latex binder |
| 10 | Lectrapel cationic fixing agent |
| 2 | Tinopal HST fluorescent whitening agent |

The cooling of the composition to below 100° F. help overcome compatibility problems in the use of latex binders.

EXAMPLE 10

An ink receptive coating was applied by a bench blade coater at 13.0 g/$m^2$ to the back side of 42 pound (68.2 g/$m^2$) coated two side, machine-glazed paper substrate. The ink receptive coating was made down at 34.9% solids and a pH value of 4.8 with the following components:

| Parts | Material |
|---|---|
| 100 | Grace Davison Syloid 63 silica gel<br>particle size 5–7$\mu$<br>pore volume 0.5 cc/g |
| 25 | Airvol 823, medium molecular weight, partially hydrolyzed polyvinyl alcohol |
| 6 | Lectrapel cationic fixing agent |

Print tests conducted on an Epson Stylus ink jet printer indicated good mottle rating of 8.5 out of a possible 9.0 and an acceptable color saturation rating 6.0 out of a possible 8.0, for a combined rating of 14.5.

EXAMPLE 11

An ink receptive coating was applied by a laboratory bench blade coater at 12.2 g/$m^2$ to a 62 pound (100 g/$m^2$) precoated, groundwood-free base sheet. The ink receptive coating composition was prepared at 35% solids and a pH value of 5.4 as follows:

| Parts | Material |
|---|---|
| 75 | Grace-Davison Syloid 620 silica gel |
| 25 | Martifin OL-107 alumina trihydrate |
| 50 | Airvol 805 low molecular weight, partially hydrolyzed polyvinyl alcohol |
| 6 | Lectrapel cationic fixing agent |

EXAMPLE 12

Example 11 was repeated, with the coating composition as follows:

| Parts | Material |
|---|---|
| 75 | Grace-Davison Syloid 620 silica gel |
| 25 | Martifin OL-107 alumina trihydrate |
| 40 | Airvol 805 low molecular weight, partially hydrolyzed polyvinyl alcohol |
| 6 | Lectrapel cationic fixing agent |

EXAMPLE 13

Example 11 was repeated, with the coating composition as follows:

| Parts | Material |
|---|---|
| 75 | Grace-Davison Syloid 620 silica gel |
| 25 | Martifin OL-107 alumina trihydrate |
| 30 | Airvol 805 low molecular weight, partially hydrolyzed polyvinyl alcohol |
| 6 | Lectrapel cationic fixing agent |

EXAMPLE 14

An ink receptive coating was applied by a laboratory bench blade coater to the same base sheet as in Examples 11 through 13. The ink receptive coating composition was prepared at 38% solids and a pH value of 5.6 as follows:

| Parts | Material |
|---|---|
| 75 | Grace-Davison Syloid 620 silica gel |
| 25 | Martifin OL-107 alumina trihydrate |
| 40 | Airvol 805 low molecular weight, partially hydrolyzed polyvinyl alcohol |
| 4 | Lectrapel cationic fixing agent |

EXAMPLE 15

Example 14 was repeated, with the coating composition as follows:

| Parts | Material |
|---|---|
| 75 | Grace-Davison Syloid 620 silica gel |
| 25 | Martifin OL-107 alumina trihydrate |
| 40 | Airvol 805 low molecular weight, partially hydrolyzed polyvinyl alcohol |
| 6 | Lectrapel cationic fixing agent |

EXAMPLE 16

Example 14 was repeated, with the coating composition as follows:

| Parts | Material |
|---|---|
| 75 | Grace-Davison Syloid 620 silica gel |
| 25 | Martifin OL-107 alumina trihydrate |
| 40 | Airvol 805 low molecular weight, partially hydrolyzed polyvinyl alcohol |
| 10 | Lectrapel cationic fixing agent |

EXAMPLE 17

An ink receptive coating was applied by a laboratory bench blade coater to the same base sheet as in Examples 11 through 16. The ink receptive coating composition was prepared at 3 5% solids and a pH value of 5.6 as follows:

| Parts | Material |
|---|---|
| 75 | Grace-Davison Syloid 620 silica gel |
| 25 | Martifin OL-107 alumina trihydrate |
| 40 | Airvol 805 low molecular weight, partially hydrolyzed polyvinyl alcohol |
| 4 | Lectrapel cationic fixing agent |

EXAMPLE 18

Example 17 was repeated, with the coating composition as follows:

| Parts | Material |
|---|---|
| 75 | Grace-Davison Syloid 620 silica gel |
| 25 | Martifin OL-107 alumina trihydrate |
| 40 | Airvol 805 low molecular weight, partially hydrolyzed polyvinyl alcohol |
| 6 | Lectrapel cationic fixing agent |

EXAMPLE 19

Example 17 was repeated, with the coating composition as follows:

| Parts | Material |
|---|---|
| 75 | Grace-Davison Syloid 620 silica gel |
| 25 | Martifin OL-107 alumina trihydrate |
| 40 | Airvol 805 low molecular weight, partially hydrolyzed polyvinyl alcohol |
| 10 | Lectrapel cationic fixing agent |

EXAMPLE 20

An ink receptive coating was applied by a laboratory bench blade coater to the same base sheet as in Examples 11 through 19. The ink receptive coating composition was prepared at 35% solids and a pH value of 5.6 as follows:

| Parts | Material |
|---|---|
| 90 | Grace-Davison Syloid 620 silica gel |
| 10 | Martifin OL-107 alumina trihydrate |
| 40 | Airvol 805 low molecular weight, partially hydrolyzed polyvinyl alcohol |
| 4 | Lectrapel cationic fixing agent |

EXAMPLE 21

Example 20 was repeated, with the coating composition as follows:

| Parts | Material |
|---|---|
| 90 | Grace-Davison Syloid 620 silica gel |
| 10 | Martifin OL-107 alumina trihydrate |
| 40 | Airvol 805 low molecular weight, partially hydrolyzed polyvinyl alcohol |
| 6 | Lectrapel cationic fixing agent |

EXAMPLE 22

Example 20 was repeated, with the coating composition as follows:

| Parts | Material |
|---|---|
| 90 | Grace-Davison Syloid 620 silica gel |
| 10 | Martifin OL-107 alumina trihydrate |
| 40 | Airvol 805 low molecular weight, partially hydrolyzed polyvinyl alcohol |
| 10 | Lectrapel cationic fixing agent |

Each of the Examples 11–22 were tested for print quality and other factors. The results are shown in table 1. An explanation of each rating follows the table. Examples 11–13 were tested to explore different binder levels. The strength tests of tape pull and scratch resistance were evaluated. The results reveal that 30 parts of Airvol 805 polyvinyl alcohol binder (Example 13) is at the point of unacceptable strength, 50 parts is higher than needed (Example 11), while 40 parts provides acceptable to good results (Example 12).

Examples 14–16, 17–19 and 20–22 were tested to evaluate the level of cationic fixing agent, in this case, Lectrapel. Examples 14–16 were conducted at 38% solids, while 17–19 were conducted at 35% solids. Examples 20–22 were tested with a different mixture of pigments. In these three series of tests, print quality was evaluated. The tests showed increasing the level of cationic fixing agent consistently improved print quality and strength, see in particular the increasing average density test results. Ten parts of Lectrapel fixing agent per 100 parts of pigment is optimum. Above 10 parts, it is believed that the coating composition becomes too chemically interactive, developing viscosity changes over time that cannot be controlled. It is also noted that higher levels of Lectrapel extends ink dry times.

Comparing Examples 14–16 with Examples 17–19 shows the effect of the solids content. In particular the lower solids formulation used in Examples 17–19 showed consistently better ink dry times.

Examples 17–19 as compared to Examples 20–22 shows the effects of the pigment mixture. Examples 17–19 are 75/25 ratio of silica/alumina while Examples 20–22 are a 90/10 ratio. The 75/25 ratio exhibited consistently better strength and rheology. The 90/10 ratio gave slightly better print quality and faster ink dry times.

TABLE 1

| Example | 11 | 12 | 13 | 14 | 15 | 16 | 17 | 18 | 19 | 20 | 21 | 22 |
|---|---|---|---|---|---|---|---|---|---|---|---|---|
| Formulation | | | | | | | | | | | | |
| Syloid 620 | | 75 | | | 75 | | | 75 | | | 90 | |
| Martifin OL-107 | | 25 | | | 25 | | | 25 | | | 10 | |
| Airvol 805 | 50 | 40 | 30 | | 40 | | | 40 | | | 40 | |
| Lectrapel | | 6 | | 4 | 6 | 10 | 4 | 6 | 10 | 4 | 6 | 10 |
| pH Value | 5.4 | 5.4 | 5.4 | 5.6 | 5.4 | 5.2 | 5.6 | 5.4 | 5.6 | 5.6 | 5.5 | 5.2 |
| Application solids | | 35% | | | 38% | | | 35% | | | 35% | |
| Smoothness | | | | | | | | | | | | |
| PrintSurf | 8.19 | 8.10 | 7.96 | 8.21 | 8.20 | 8.22 | 8.04 | 8.03 | 8.07 | 7.92 | 7.92 | 7.98 |
| Hagerty | 301 | 274 | 248 | 266 | 272 | 278 | 265 | 270 | 283 | 263 | 270 | 278 |
| Strength | | | | | | | | | | | | |
| Tape Pull | 5 | 2 | 1 | 2 | 4 | 5 | 1 | 2.5 | 4 | 0 | 1 | 3 |
| Scratch Resistance | 5 | 4 | 2 | 3.5 | 3.5 | 4 | 3 | 3.5 | 4.5 | 1.5 | 1 | 1.5 |
| Epson Stylus | | | | | | | | | | | | |
| Intensity | 8 | 7 | 6 | 8 | 8 | 8+ | 7 | 7 | 7 | 7 | 7 | 7 |
| HTM | 8 | 8 | 9 | 8 | 8 | 8 | 8 | 8 | 8 | 8 | 8 | 8 |
| Total | 16 | 15 | 15 | 16 | 16 | 16+ | 15 | 15 | 15 | 15 | 15 | 15 |
| Ave. Density[1] | 1.56 | 1.50 | 1.40 | 1.50 | 1.53 | 1.55 | 1.46 | 1.49 | 1.53 | 1.51 | 1.52 | 1.58 |
| Hewlett Packard | | | | | | | | | | | | |
| Ink Dry Time, Sec. | 80 | 21 | 0 | 40 | 51 | 96 | 16 | 33 | 78 | 0 | 0 | 25 |
| Mottle | 2 | 1 | 1 | 1 | 1 | 2 | 2 | 1 | 2 | 2 | 2 | 1 |
| Pigment Black | 1 | 1 | 2 | 1.5 | 1 | 1 | 1 | 1 | 1 | 2 | 2 | 1 |
| Rheology[2] | 12.1 | 8.9 | 6.3 | 16.0 | 17.9 | 19.9 | 8.6 | 8.9 | 11.9 | 11.3 | 11.7 | 14.2 |

[1]Average of six density readings: 2 Magenta, 2 red, 2 black
[2]Average torque $400^{-1\ sec}$, Hercules Viscometer DV-10

EXAMPLE 23

A coating composition of the same formula as in Example 6 was prepared. Sodium hydroxide (NaOH) was added to a portion of the sample to raise the pH value to 7.5. The coating was applied with a laboratory blade coater at 12.2 g/m$^2$ to the wire side a 62 pound (92 g/m$^2$) precoated, groundwood-free base sheet. After drying, the paper was print tested. The print quality was comparable to a sample having a pH of about 5.3, but the ink dry time for the 7.5 pH sample was about 50% longer than the 5.3 pH sample.

EXAMPLE 24

An ink receptive coating was applied by a laboratory bench blade coater at 12.2 g/m$^2$ to a 62 pound (92 g/m$^2$) precoated, groundwood-free base sheet. The ink receptive coating was prepared at 32.7% solids and a pH value of 5.2, as follows:

| Parts | Material |
|---|---|
| 60 | Grace Davison Sylojet C silica gel<br>17μ particle size<br>2.1 cc/g pore volume |
| 40 | Martifin OL-107 alumina trihydrate |
| 40 | Airvol 805 low molecular weight, partially hydrolyzed polyvinyl alcohol |

-continued

| Parts | Material |
|---|---|
| 10 | Lectrapel cationic fixing agent |
| 2 | Tinopal HST fluorescent whitening agent |
| 0.11 | NaOH @ 20% |

EXAMPLE 25

An ink receptive coating was prepared as in Example 24, except that the pigment mix was varied to 50 parts of Sylojet C and 50 parts of Martifin OL-107. The pH value was 5.3.

The Example 24 and 25 samples had comparable, acceptable print test results. Some adverse bleeding of the pigment black was noted. Example 25 had a longer drying time, undoubtedly due to the lower level of silica gel. The coating layer strength as measured by the tape pull and scratch resistance tests were very low in both Examples 24 and 25.

EXAMPLE 26

An ink receptive coating was applied by a laboratory bench blade coater at 10.5 g/m$^2$ to a 62 pound (92 g/m$^2$) precoated groundwood-free base sheet. The coating composition was prepared at 27.5% solids and a pH of 4.3 as follows:

| Parts | Material |
|---|---|
| 75 | Grace Davison Sylojet C silica gel<br>17$\mu$ particle size<br>2.1 cc/g pore volume |
| 25 | Martifin OL-107 alumina trihydrate |
| 20 | Airvol 823 medium molecular weight, partially hydrolyzed polyvinyl |
| 20 | Elvanol 9050 medium molecular weight, partially hydrolyzed polyvinyl |
| 10 | Lectrapel cationic fixing agent |

EXAMPLE 27

A surface sizing agent was added to the coating composition of Example 26. Specifically, 10 parts of a styrene acrylic copolymer (MSA-150 by Morton International) per 100 parts of pigment were added to the composition. Print tests showed that the addition of the sizing agent significantly improved pigment black print quality, reducing bleeding. However, the Example 27 sample had longer ink dry time than Example 26.

EXAMPLE 28

A base paper is manufactured on a machine at 34 lbs/3000 ft.$^2$. The fiber Fish is not critical but is roughly 70% soft wood kraft and 30% hard wood kraft. Base ash ~5% comprises mostly high brightness clay. Rosin sizing is added to achieve Cobb sizing=40 g/m$^2$/min. The TAPPI brightness target for the base paper is 86+.

This paper is coated on-machine on the machine glazed ("MG") side at 5 lbs/3000 ft.$^2$ with the following high brightness formulation (this is an anti-curl coating application):

| Bone Dry Parts | Materials |
|---|---|
| 90 | High brightness clay (>90% reflectance) |
| 10 | Titanium dioxide ($TiO_2$) (>95% reflectance) |
| 17 | B-15 acrylic latex from Rohm & Haas |
| 3 | Procote 183-Z (soy protein from Protein Technologies) |

This sheet was size coated on the back side ("BS") at 2.5 lbs./3000 ft.$^2$ with the following formulation:

| Bone Dry Parts | Materials |
|---|---|
| 60 | High brightness clay (>90% reflectance) |
| 40 | $TiO_2$ (>95% reflectance) |
| 20 | white latex |
| 3 | Procote 183-Z |

BS TAPPI brightness target is >85.

This coated two-side (C2S) base is the coated on the BS with the receptor ink jet formulation at 8 lbs./3000 ft.$^2$ The receptor formulation is as follows:

| Bone Dry Parts | Materials |
|---|---|
| 100 | Celite WPP at 34% solids in water (calcined diatomaceous earth) |
| 1 | Dispex N-40 pigment dispersant (from Allied Colloids) |
| 6 | Lectrapel at 40% solids (polycationic quaternary ammonium polymer) |
| 12 | Basoplast 335D at 35% solids (copolymer of acrylic acid esters and acrylonitrile) |
| — | Water to 36% solids |
| 20 | Polyox N-80 at 100% (polyethylene oxide) |
| 0.7 | Ammonium hydroxide ($NH_4OH$) |
| Solids is 36% | |

This coated medium gave excellent four color print quality in the HP 560 printer (300 dpi resolution). It gave mottle-free print with no bleeding or feathering. The inks did not penetrate to the back side paper. Paper cockle was slight and did not affect either printer runnability or printability. The coating was scratch resistant, did not dust, and was water resistant. Water can be blotted off without penetrating. TAPPI brightness is >84.0. Printed dot diameters were 80–90$\mu$.

This sheet also printed mottle-free in the Epson Stylus printer at both 360 and 720 dpi. Epson printed dot diameters were ~50$\mu$.

EXAMPLE 29

Example 28 was repeated except that the Basoplast in the ink jet receptor coating was replaced with a blend of 2 parts AKD sizing agent Hercon 70 (alkyl ketene dimer), a cellulose reactive sizing agent, and 10 parts B-15 latex (acrylic latex). All print properties were similar except printed dot diameters were reduced somewhat. Epson Stylus printer dots were 48$\mu$ in diameter while the HP560 dots were 70–80$\mu$ in diameter.

EXAMPLE 30

Using the same C2S base described in Examples 28 and 29, the following ink jet receptor coating was applied to the BS at 4.5 lbs./3000 ft.$^2$ using a bench blade coater:

| Bone Dry Parts | Materials |
|---|---|
| 1 | Dispex N-40 pigment dispersant |
| 100 | Celite WPP (dispersed at 36% solids) |
| 25 | Airvol 823 PVOH at 15% solids |
| 6 | Lectrapel at 40% solids |
| Solids is 28.5% | |

We measured only printed dot diameters as coat weight was too low for adequate print drying and mottle free printing. Epson Stylus dot diameters were 113$\mu$ and HP 560 dot diameters were 145$\mu$. Thus, by changing binder and eliminating the sizing agent we were able to increase dot size dramatically. This coating did have sufficient binder to be scratch resistant.

EXAMPLE 31

Example 30 was repeated except that 2 parts Hercon were added to the formulation. Coating solids were increased to 38.5% and coat weight was increased to 8 lbs./3000 ft.$^2$, Epson Stylus dot diameters were 72$\mu$, HP 560 dot diameters were 90$\mu$. Thus, by adding Hercon in incremental levels, dot sizes can be controlled between 70–150$\mu$.

EXAMPLE 32

A base was manufactured as in Example 28 except that:

A. A wet strength additive was included in the furnish.

B. The base was not precoated.

The receptor formulation was as follows:

| Bone Dry Parts | Materials |
|---|---|
| 20 | Airvol 823 @ 15% solids |
| 55 | Celite WPP @ 34% solids in water (calcined diatamaceous earth) |
| 1 | Dispex N40 pigment dispersant (from Allied Colloids) |
| 45 | Celite WPP dry |
| 6 | Lectrapel @ 40% |

The receptor ink jet coating was applied @ 4 lbs/3000 ft.$^2$ to the MG of this base. This medium gave satisfactory HP 560 print quality and printed with only slight mottle on the Epson Stylus printer. Epson dot size was 86$\mu$. Ink dry time was less than 5 seconds. TAPPI brightness of the MG base was 82+.

While the perferred embodiment of the invention and representative examples have been shown and described, it is to be understood that various modifications and changes could be made thereto without departing from the appended claims.

What is claimed is:

1. An aqueous coating composition for an ink jet recording sheet, comprising:

a) one or more pigments, at least 50% by weight of said pigments comprising an absorptive non-agglomerated silica gel pigment, b) a binder comprising between 10%–50% by weight of said pigment, c) a sizing agent comprising between 1%–10% by weight of said pigment, d) a cationic fixing agent comprising between 2%–20% by weight of said pigment, e) the aqueous composition being acidic and f) the aqueous composition having a solids content of at least 30%.

2. The aqueous coating composition of claim 1, wherein said silica gel has a primary pore volume of between 0.5 and 2.0 cc/g.

3. The aqueous coating composition of claim 1, wherein said pigment comprises, by weight, at least 10% alumina.

4. The aqueous coating composition of claim 1, wherein said pigment comprises, by weight, up to 25% alumina and at least 75% silica.

5. The aqueous coating composition of claim 1, wherein said sizing agent comprises a styrene acrylic dispersion.

6. The aqueous coating composition of claim 1, wherein said sizing agent comprises a styrene butadiene latex.

7. The aqueous coating composition of claim 1, wherein said cationic fixing agent comprises by weight between 4–10% of said pigment weight.

8. The aqueous coating composition of claim 1, wherein said cationic fixing agent comprises a polycationic quaternary ammonium polymer.

9. The aqueous coating composition of claim 1, wherein said binder comprises low molecular weight, partially hydrolyzed, polyvinyl alcohol.

10. The aqueous coating composition of claim 1, wherein the composition has a solids content, by weight, of between 35% and 38%.

11. The aqueous coating composition of claim 1, wherein the pH value of the composition is between 4.5 and 5.5.

12. An aqueous coating composition for an ink jet recording sheet, comprising one or more pigments, a binder and a cationic fixing agent, at least 50% by weight of said pigments comprising a non-agglomerated, absorptive silica pigment, said coating composition having a pH value less than 7.

13. An aqueous coating composition as in claim 12 further comprising a sizing agent.

14. An aqueous coating composition as in claim 12, wherein said composition has a solids content greater than about 30%.

15. An aqueous coating composition for an ink jet recording sheet, comprising:

a) one or more pigments comprised of at least 50% by weight of non-agglomerated absorptive silica gel with primary pore volume of between 0.5 and 2.0 cc/g, b) polyvinyl alcohol binder comprising between 30%–50% by weight of said pigment, c) a sizing agent comprising by weight 1%–10% of said pigment weight, d) a cationic fixing agent comprising between 4–10% by weight of said pigment, e) the pH value of the composition being between 4 and 7, and f) the composition having a solids content greater than 30%.

16. The aqueous coating composition of claim 15, wherein at least 10% by weight of said pigment is alumina.

17. An aqueous coating composition for an ink jet recording sheet, comprising:

a) an absorptive pigment comprised of up to 25% by weight of alumina and at least about 75% of non-agglomerated absorptive silica gel with primary pore volume of between 0.5 and 2.0 cc/g, b) a polyvinyl alcohol binder comprising between 30%–50% by weight of said pigment, c) a styrene acrylic sizing agent comprising between 1%–10% by weight of said pigment, d) a cationic fixing agent comprising between 4%–10% by weight of said pigment, e) the pH value of the composition being between 4.5 and 5.5, and f) the composition having a solids content of between 35% and 38% by weight.

18. An ink jet recording medium comprising a substrate and an ink receiving coating layer on said substrate, said coating layer having a weight of at least 7 g/m$^2$, said coating layer comprising one or more pigments at least 50% by weight of which is a non-agglomerated, absorptive silica gel pigment, a binder comprising between 10–50 parts by weight per 100 parts pigment, a sizing agent comprising between 1–10 parts by weight per 100 parts pigment, and about 4–10 parts by weight of a cationic fixing agent per 100 parts pigment, and said coating layer having a surface pH value of less than 7.0.

19. An ink jet recording medium an in claim 18, wherein said coating layer further comprises a sizing agent.

20. An ink jet recording medium as in claim 18, wherein said pigment comprises, by weight, at least 75% silica gel having a primary pore volume of about 0.5 to about 2.0 cc/g of coating, and up to 25% alumina.

21. An ink jet recording medium as in claim 18, wherein said substrate has a wet strength resin to prevent cockle.

22. An ink jet recording medium as in claim 18, further comprising at least one intermediate coating layer between said substrate and said ink receiving coating layer.

23. An ink jet recording medium as in claim 18, wherein said ink receiving coating layer is calendered.

* * * * *